United States Patent
Urquhart et al.

(10) Patent No.: US 7,328,219 B2
(45) Date of Patent: Feb. 5, 2008

(54) SYSTEM AND METHOD FOR PROCESSING ELECTRONIC DATA FROM MULTIPLE DATA SOURCES

(75) Inventors: Andrew L. Urquhart, Wylie, TX (US); Rick D. Scoggins, McKinney, TX (US); Richard J. Ernst, Rowlett, TX (US); Susannah R. Campbell, Rowlett, TX (US); Jeffrey D. Lewis, Arlington, TX (US); Carl A. Poindexter, Cleburne, TX (US); John N. Carbone, Garland, TX (US)

(73) Assignee: Raytheon Company, Waltham, MA (US)

( * ) Notice: Subject to any disclaimer, the term of this patent is extended or adjusted under 35 U.S.C. 154(b) by 530 days.

(21) Appl. No.: 10/379,153

(22) Filed: Mar. 3, 2003

(65) Prior Publication Data

US 2004/0177062 A1    Sep. 9, 2004

(51) Int. Cl.
*G06F 17/30* (2006.01)
(52) U.S. Cl. .................... 707/101; 707/6; 707/102
(58) Field of Classification Search .............. 707/3, 707/6, 10, 100, 101, 102
See application file for complete search history.

(56) References Cited

U.S. PATENT DOCUMENTS

2002/0073119 A1    6/2002   Richard ............... 705/513
2002/0143821 A1   10/2002   Jakubowski ........... 707/522
2003/0007397 A1    1/2003   Kobayashi ............ 365/200

FOREIGN PATENT DOCUMENTS

WO    WO00/02141 A1    1/2000
WO    WO02/21291 A1    3/2002

OTHER PUBLICATIONS

Notification of Transmittal of the International Search Report or the Declaration (PCT Rule 44.1) mailed Nov. 2, 2004 (13 pages) re International Application No. PCT/US 2004/005332.
Credible XML, "Make Everything XML," 1 page, Dec. 11, 2002.
Unidex, Inc., "B2B Integration Solutions from Unidex—XML Convert," 1 page, Dec. 11, 2002.
Unidex, Inc., "B2B Integration Solutions from Unidex—Overview of XML Convert and XFlat," 11 pages, Dec. 11, 2002.

*Primary Examiner*—Jean M. Corrielus
(74) *Attorney, Agent, or Firm*—Baker Botts L.L.P.

(57) ABSTRACT

A method for processing data streams from multiple data sources comprises receiving a data stream from a data source. A data template is dynamically selected, the data template comprising at least one data template region. A data region of the data stream is selected based on one of the data template regions. At least a portion of the data region is mapped to an intermediate data store based on the data template region. The mapped portion of the data region is extracted and stored in the intermediate data store.

26 Claims, 3 Drawing Sheets

SYSTEM AND METHOD FOR PROCESSING ELECTRONIC DATA FROM MULTIPLE DATA SOURCES

TECHNICAL FIELD OF THE INVENTION

This invention relates to data processing systems and, more specifically, to a system and method for processing electronic data from multiple data sources.

BACKGROUND OF THE INVENTION

Data processing systems generally receive data from a data source, process the data according to particular rules, and store the processed data for later transactions. Traditionally, modifying these data processing systems to receive a second data type that uses a different format from the first data type requires a tedious and extensive programming effort. These conventional systems normally require redundant control logic and additional programming modules to process the additional data formats. This prohibits current data processing systems from efficiently and dynamically processing new data formats.

SUMMARY OF THE INVENTION

In accordance with the present invention, the disadvantages and problems associated with data processing systems have been substantially reduced or eliminated.

One aspect of the invention is a method for processing data streams from multiple data sources, the method comprising receiving a data stream from a data source. A data template is dynamically selected, the data template comprising at least one data template region. A data region of the data stream is selected based on one of the data template regions. At least a portion of the data region is mapped to an intermediate data store based on the data template region. The mapped portion of the data region is extracted and stored in the intermediate data store.

The invention has several important technical advantages. Various embodiments of the invention may have none, some, or all of these advantages. One advantage of the present invention is that it allows a data processing system to easily and efficiently process additional data formats from one or more data sources. Another advantage of the present invention might be a separation of a rule set, for processing a data format, and the control logic. This results in less labor being required to update the data processing system to handle new and evolved data formats. Further potential advantages include portability of the various processing modules and rule sets, distributability across multiple computer systems, and flexibility. Other technical advantages of the present invention will be readily apparent to one skilled in the art.

BRIEF DESCRIPTION OF THE DRAWINGS

For a more complete understanding of the present invention and its advantages, reference is now made to the following descriptions, taken in conjunction with the accompanying drawings, in which.

DETAILED DESCRIPTION OF EXAMPLE EMBODIMENTS OF THE INVENTION

Figure 1:
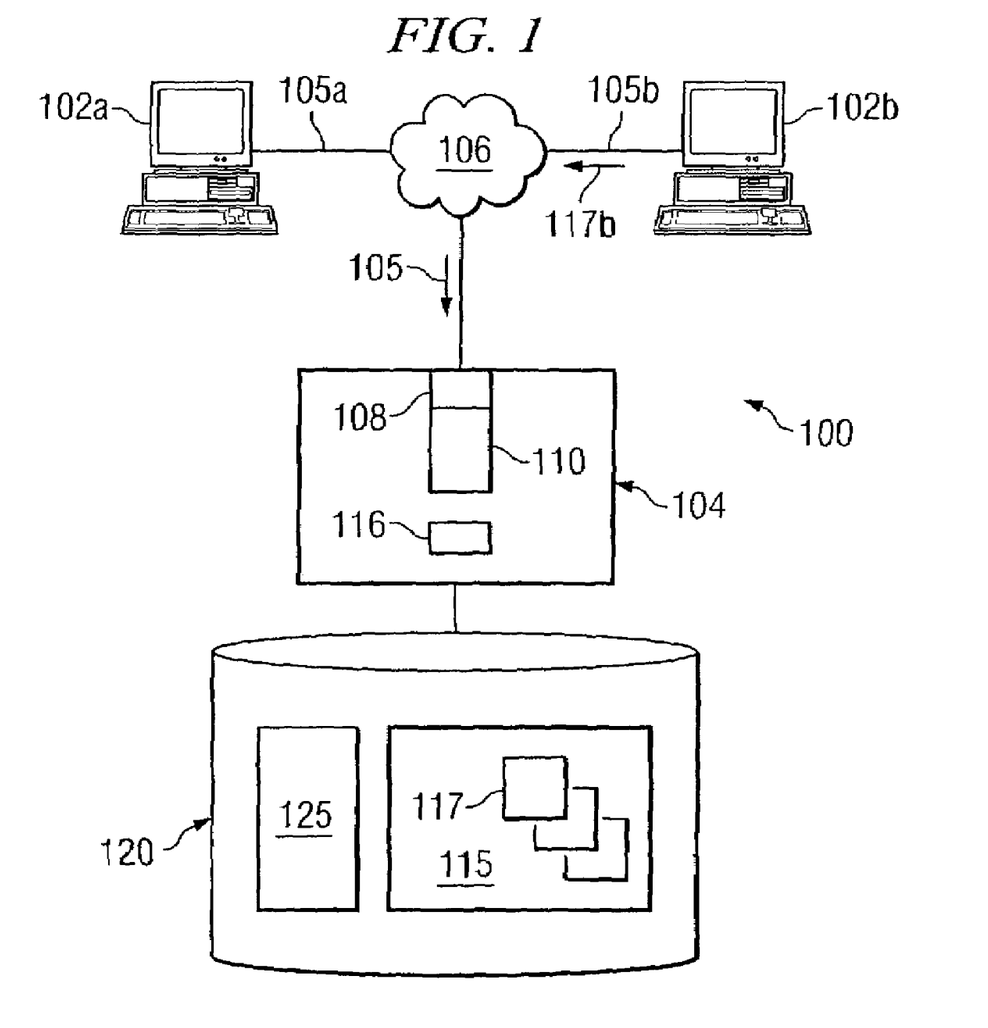
FIG. 1 illustrates a portion of a data processing system for processing data streams from multiple data sources according to various embodiments of the present invention.

FIG. 1 illustrates a portion of a data processing system 100 for processing data streams from multiple data sources according to various embodiments of the present invention. In general, system 100 allows server 104 to efficiently process data streams 150 in different formats from a plurality of data sources 102 without expensive modifications to server 104 to accommodate the additional formats. System 100 uses a data template 117 to map data from a related data stream 105 into a common format. System 100 includes data sources 102, server 104, and network 106. Other embodiments of system 100 may be used without departing from the scope of this disclosure.

Data sources 102 are coupled to server 104 via network 106. Each data source 102 may represent any suitable computing or communicating device through which a participant may communicate one or more data streams 105. Data source 102 could, for example, represent a desktop computer, a laptop computer, a server computer, a mainframe, a scanner, a wireless device, and/or any other suitable device. Data stream 105 illustrates any structured or unstructured information in any format such as, for example, plain text, comma-separated-values (CSV) file, XML file, relational database table, EFT transaction, or any other suitable data structure. Further, data stream 105 may include a header that stores various information to aid system 100 such as, for example, a data template identifier. In the illustrated embodiment, data sources 102 have been divided into first data source 102a associated with a first data stream 105a and second data source 102b associated with a second data stream 105b. This is for ease of illustration and explanation only. As described above, one data source 102 could, for example, represent one or more sources for data streams 105 over network 106. In one example, data source 102 represents a vendor or customer in an electronic market that communicates invoices or reports, represented by data stream 105, to a central processor, illustrated by server 104, through network 106.

Network 106 couples server 104 and data sources 102. Network 106 facilitates communication between various components of system 100. Network 106 may, for example, communicate Internet Protocol (IP) packets, frame relay frames, Asynchronous Transfer Mode (ATM) cells, and/or other suitable information between network addresses. Network 106 may include one or more intranets, local area networks (LANs), metropolitan area networks (MANs), wide area networks (WANs), all or a portion of the Internet, and/or any other communication system or systems at one or more locations. Data sources 102 may reside inside server 104, in which case network 106 may represent internal communication capabilities inherent in server 104.

Server 104 processes data streams 105 and comprises a computing device operable to receive, transmit, process and store data associated with system 100. For example, server 104 may comprise a general-purpose personal computer (PC), a Macintosh, a workstation, a Unix-based computer, a server computer, or any other suitable device. Server 104 communicates with one or more data sources 102 over network 106. Server 104 includes memory 120, processor 116, interface 108, and parsing engine 110. In one embodiment, parsing engine 110 comprises a software application that may be stored in memory 120 and executed by processor 116. Although FIG. 1 provides one example of a server that may be used with the invention, system 100 can be implemented using computers other than servers, as well as a server pool. Server 104 may include any hardware, software, firmware, or combination thereof operable to process data streams 105. According to one embodiment, server 104 may comprise a web server. One function of server 104 might be to allow data source 102 to send or receive content over or from the Internet using a standard user interface language such as, for example, the Extensible Markup Language (XML) or Hypertext Markup Language (HTML). Server 104 can accept a data stream 105 from data source 102 via a web browser (e.g., Microsoft Internet Explorer or Netscape Navigator) and return the appropriate HTML responses. It should be understood that one or more modules of system 100 may be included in the same computing device. For example, data source 102a and data source 102b may be different modules in one clearinghouse data source operable to communicate first and second data streams 105.

Memory 120 may include any memory or database module and may take the form of volatile or non-volatile memory including, without limitation, magnetic media, optical media, random access memory (RAM), read-only memory (ROM), removable media, or any other suitable local or remote memory component. In this embodiment, memory 120 includes stored data template table 115, which includes at least one data template 117, and intermediate data store 125. Memory 120 may include any other data such as, for example, relational database tables or account information for data sources 102. Although FIG. 1 illustrates memory 120 as residing externally to server 104, memory 120 may reside internally or at any other location or locations accessible by processor 116. Processor 116 executes instructions and manipulates data to perform the operations of server 104. Although FIG. 1 illustrates a single processor 116 in server 104, multiple processors 116 may be used according to particular needs, and reference to processor 116 is meant to include multiple processors 116 where applicable. In the illustrated embodiment, processor 116 executes parsing engine 110 and processes data streams 105 and data templates 117.

System 100 uses stored data template table 115 to dynamically process received data streams 105. Stored data template table 115 may be of any suitable format including XML control files, XSLT, flat files, comma-separated-value (CSV) files, SQL tables, relational database tables, and others. In one embodiment, stored data template table 115 is a multidimensional data structure that includes at least one data template 117. Each stored data template 117 logically represents one technique of parsing or normalizing a particular format of one or more data streams 105. Data template 117 includes one or more data template regions. The data template regions allow parsing engine 110 to segregate data stream 105 into portions that aid in mapping and extracting desired data from data stream 105. Each data template region may include datums, regular expressions, sub-expressions, or any other appropriate logic for partitioning data from data stream 105. Server 104 locates desired data in data stream 105 using these expressions from data template 117. Each datum or expression has a unique identifier that allows system 100 to map the located information from data stream 105 to one or more intermediate data stores 125. Each data store 125 can be validated, modified, reformatted, converted, or can be used to determine other user defined independent execution. It will be understood that data template 117 may include alternate expressions for when system 100 is unable to locate the searched-for expression in data stream 105. According to particular embodiments, each data template region includes a starting expression, or pattern, that delimits the beginning of the region. Each data template region may further include an ending expression that defines the end of the region. Each pair of starting and ending expressions may be applied multiple times to data stream 105, in which case the delimited region may be discontinuous in data stream 105. Further, data template regions may be recursively nested so that the nesting regions limit the possible scope of the nested regions. One example of data template 117 includes:

```
<TEMPLATE NAME="Edited_Solar_Events" OUTNAME="Edited_Solar_Events">
    <REGION ID="CDATE">
        <LINE-PATTERN>^:Date:.*$</LINE-PATTERN>
    </REGION>
    <REGION ID="DATA">
        <START-PATTERN OFFSET="2">^#Event.*$</START-PATTERN>
        <END-PATTERN>^:Product:.*$</END-PATTERN>
    </REGION>
    <DATUM FIELD="EVENT">
        <FIXED>'</FIXED>
        <MATCH-PATTERN REGION="DATA" SUBEXPR="1" DUPLICATES="YES">
            ^(\d{4}).{7}(\d{4}).{3}{.4}).{6}(\d{4}).{2}(.{3})).{6}(.{3}).*$
        <MATCH-PATTERN>
        <FIXED>'</FIXED>
    </DATUM>
    <DATUM FIELD="TYPE">
        <FIXED>'</FIXED>
        <MATCH-PATTERN REGION="DATA" SUBEXPR="6" DUPLICATES="YES">
            ^(\d{4}).{7}(\d{4}).{3}(.{4}).{6}(\d{4}).{2}(.{3}).{6}(.{3}).*$
        </MATCH-PATTERN>
        <FIXED>'</FIXED>
    </DATUM>
    <DATUM FIELD="OBSERVER">
        <FIXED>'</FIXED>
        <MATCH-PATTERN REGION="DATA" SUBEXPR="5" DUPLICATES="YES">
            ^(\d{4}).{7}(\d{4}).{3}(.{4}).{6}(\d{4)).{2}(.{3}).{6}(.{3}).*$
        </MATCH-PATTERN>
        <FIXED>'</FIXED>
    </DATUM>
    <DATUM FIELD="REGION">
```

```
            -continued
    <ALTERNATIVE>
        <FIXED>'</FIXED>
        <MATCH-PATTERN REGION="DATA" SUBEXPR="7" DUPLICATES="YES">
            ^(\d{4}).{7}(\d{4}).{3}(.{4}).{6}(\d{4}).{2}(.{3}).{6}(.{3}).{30}(\d{4})$
        </MATCH-PATTERN>
        <FIXED>'</FIXED>
    </ALTERNATIVE>
    <ALTERNATIVE>NULL</ALTERNATIVE>
</DATUM>
<DATUM FIELD="START_TIME">
    <FIXED>'</FIXED>
    <MATCH-PATTERN REGION="CDATE" SUBEXPR="1" DUPLICATES="YES">
        ^:Date:\s(\d{4}\s\d{2}\s\d{2}).*$
    </MATCH-PATTERN>
    <SPACE/>
    <MATCH-PATTERN REGION="DATA" SUBEXPR="2" DUPLICATES="YES">
        ^(\d{4}).{7}(\d{4}).{3}(.{4}).{6}(\d{4}).{2}(.{3}).{6}(.{3}).*$
    </MATCH-PATTERN>
    <FIELD>'</FIXED>
</DATUM>
<DATUM FIELD="MAX_TIME">
    <ALTERNATIVE>
        <FIELD>'</FIXED>
        <MATCH-PATTERN REGION="CDATE" SUBEXPR="1" DUPLICATES="YES">
            ^(:Date:\s(\d{4}\s\d{2}\s\d{2}).*$
        </MATCH-PATTERN>
        <SPACE/>
        <MATCH-PATTERN REGION="DATA" SUBEXPR="3" DUPLICATES="YES">
            ^(\d{4}).{7}(\d{4}).{3}(\d{4}).{6}(\d{4}).{2}(.{3}).{6}(.{3}).*$
        </MATCH-PATTERN>
        <FIELD>'</FIXED>
    </ALTERNATIVE>
    <ALTERNATIVE>NULL</ALTERNATIVE>
</DATUM>
<DATUM FIELD"END_TIME">
    <FIELD>'</FIXED>
    <MATCH-PATTERN REGION="CDATE" SUBEXPR="1" DUPLICATES="YES">
        ^:Date:\s(\d{4}\s\d{2}\s\d{2}).*$
    </MATCH-PATTERN>
    <SPACE/>
    <MATCH-PATTERN REGION="DATA" SUBEXPR="4" DUPLICATES="YES">
        ^((\d{4}).{7}(\d{4}).{3}(.{4}).{6}(\d{4}).{2}(./{3}).{6}(.{3}).*$
    </MATCH-PATTERN>
    <FIELD>'</FIXED>
</DATUM>
</TEMPLATE>
```

In lay terms, the foregoing exemplary data template 117 allows system 100 to locate data in data stream 105 based on the expressions, or patterns, included in each data template region. This flexible technique provides system 100 the ability to map and extract the desired data from data stream 105 regardless of typographical errors in, or different layouts of, data stream 105.

System 100 uses intermediate data store 125 to store the desired data extracted by parsing engine 110 based on data template 117. In general, intermediate data store 125 allows system 100 to maintain the normalized data received from multiple data sources 102 in a unified fashion. Intermediate data store 125 may be XML, flat files, CSV files, SQL statements, relational database tables, HTML pages, or any other appropriate data structure to store normalized data. Intermediate data store 125 may include name-value pairs, expressions, or any other appropriate data extracted from data streams 105. In one embodiment, server 104 may convert the extracted data into an intermediate format for processing by other components. This intermediate format may be used in intermediate data store 125. One example of intermediate data store 125 logic is illustrated below:

```
<xsl:stylesheet version="1.0"
xmlns:xsl="http//www.w3.org/1999/XSL/Transform">
    <xsl:output method="xml" indent="no"/>
    <xsl:strip-space elements="Root RECORD DATUM FIELD
    VALUE"/>
    <!-- field name output template -->
    <xsl:template name="fields">
        <xsl:for-each select="DATUM/FIELD">
            <xsl:if test="position( )>1">
                <xsl:text>,</xsl:text>
            </xsl:if>
            <xsl:value-of select="."/>
        </xsl:for-each>
    </xsl:template>
    <!-- value output template -->
    <xsl:template name="values">
        <xsl:for-each select="DATUM/FIELD">
            <xsl:if test="position( )>1">
                <xsl:text>,</xsl:text>
            </xsl:if>
            <xsl:value-of select="../VALUE"/>
        </xsl:for-each>
    </xsl:template>
    <xsl:template match="RECORD">
<SQL>
INSERT INTO <xsl:value-of select="@OUTNAME"/>
```

```
(<xsl:call-template name="fields"/>) VALUES
(<xsl:call-template name="values"/>);
</SQL>
<xsl:text>
</xsl:text>
<xsl:text>
</xsl:text>
    </xsl:template>
</xsl:stylesheet>
```

Parsing engine 110 processes data streams 105 based on data templates 117 and stores the normalized output in intermediate data store 125. Parsing engine 110 could include any hardware, software, firmware, or combination thereof operable to process data streams 105. Parsing engine 110 may be written in any appropriate computer language such as, for example, C, C++, Java, Pascal, and others. It will be understood that while parsing engine 110 is illustrated as a single multi-tasked module, multiple modules may perform the features and functionality performed by this engine. In one embodiment, parsing engine 110 receives data stream 105 through an interface 108. Parsing engine 110 may further communicate information to another computer through interface 108 or any other communications link. For example, parsing engine 110 may communicate a "success message" to data source 102a, in response to parsing engine 110 successfully processing data stream 105 from data source 102a.

Interface 108 comprises logic encoded in software and/or hardware in a suitable combination and operable to communicate with network 106. More specifically, interface 108 may comprise software supporting one or more communications protocols associated with network 106 and communications network hardware operable to communicate physical signals associated with network 106. For example, interface 108 may support the transmission control protocol/internet protocol (TCP/IP), the Ethernet protocol, asynchronous transfer mode (ATM), SONET, the network service address protocol (NSAP) and other open systems interconnect (OSI) protocols. According to particular embodiments, interface 108 has multiple ports that allow server 104 to identify a particular data stream 105. For example, first data source 102a communicates a first data stream 105a to a first port in interface 108. Second data source 102b communicates a second data stream 105b to a second port in interface 108. In other words, interface 108 may allow server 104 to identify the particular data source 102 for a particular data stream 105 based on data ports.

In one aspect of operation, first data source 102a communicates a first data stream 105a, such as an invoice or a report, to server 104. Server 104 receives first data stream 105a through interface 108. Parsing engine 110 processes first data stream 105a, using the appropriate data template 117, so that data stream 105a may be normalized and stored in intermediate data store 125. Parsing engine 110 dynamically determines the appropriate data template 117 based upon any number of parameters such as, for example, a data template ID attached to data stream 105a, the port in interface 108 through which data stream 105 is received, or any other appropriate criteria. Using these criteria, parsing engine 110 accesses stored data template table 115 and selects the appropriate data template 117. In other words, parsing engine 110 receives data stream 105a and dynamically selects the appropriate data template 117 for data stream 105 based on any suitable criteria. It will be understood that dynamic selection normally occurs without interaction from a user of system 100, which allows system 100 to process multiple data streams 105 quickly and efficiently. Using the selected data template 117, parsing engine 110 maps data from data stream 105 to intermediate data store 125.

Parsing engine 110 uses data template regions from the selected data template 117 to divide data stream 105 into mappable data regions. According to particular embodiments, parsing engine 110 selects the first regular expression from the desired data template region and scans the data stream for substantially similar data in data stream 105 to locate the matching data region. Once the data region is located, parsing engine 110 locates and maps the desired data or data elements in the data region based on sub-expressions in the data template region. It will be understood that, if parsing engine 110 is unable to locate one of the data elements in the data region, parsing engine 110 may, alternatively or in combination, search the data region for an alternate expression and/or search an alternate data region for the regular or alternate sub-expression. Once the data has been mapped, parsing engine 110 extracts the mapped data and stores it in intermediate data store 125.

In another aspect of operation, second data source 102b communicates the appropriate data template 117 to server 104. Second data source 102b communicates a second data stream 105b and a data template 117b. It should be understood that data template 117b may be different from, substantially similar to, or equal to one or more stored data templates 117 that reside in stored data template table 115. Server 104 receives second data stream 105b through interface 108. Server 104 may also receive data template 117b through interface 108. In this example, parsing engine 110 recognizes that second data source 102b communicated data template 117b. Accordingly, parsing engine 110 uses the received data template 117b to extract the desired data from second data stream 105b in a similar fashion to that described above. Parsing engine 110 then stores the extracted data from second data stream 105b in intermediate data store 125.

Figure 2A:
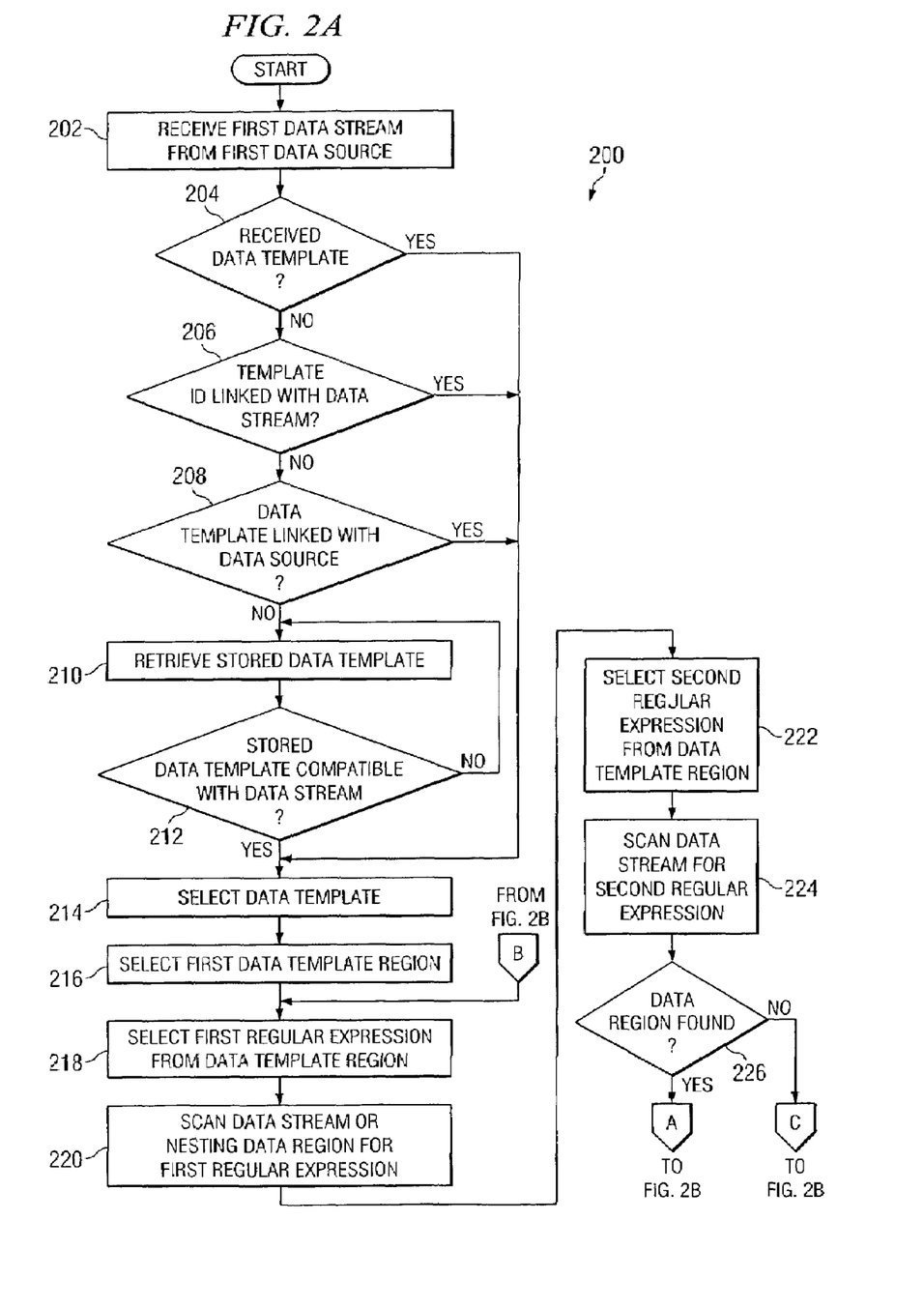
FIG. 2 is a flowchart illustrating a method for processing data streams from multiple data sources.
Figure 2B:
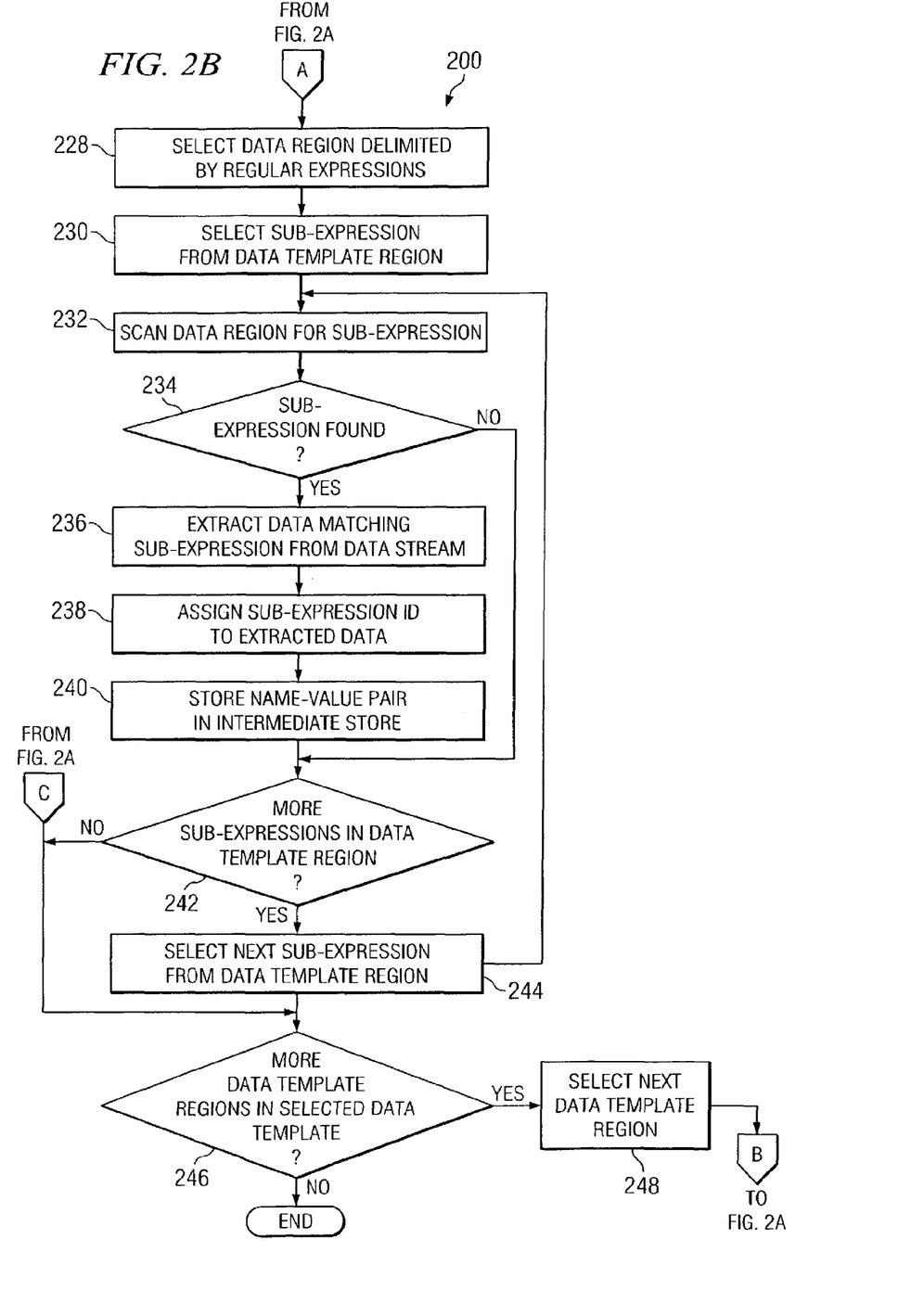

FIG. 2 is a flowchart illustrating a method 200 for processing data streams 105 from multiple data sources 102. The following description focuses on the operation of parsing engine 110, since this module illustrates functional elements that provide for this processing scheme. However, as noted, system 100 contemplates any suitable combination and arrangement of functional elements for providing these operations, and these techniques can be combined with other techniques as appropriate.

Parsing engine 110 receives first data stream 105 from first data source 102a through interface 108 at step 202. At decisional step 204, parsing engine 110 determines whether first data source 102a also communicated data template 117. If parsing engine 110 receives data template 117 from first data source 102a, then execution proceeds to step 214, where parsing engine 110 selects the received data template 117. If no data template 117 was communicated by first data source 102a, then parsing engine 110 determines if there is a data template identifier linked with the first data stream 105. As described above, first data stream 105 may include a header that contains the data template identifier. If there is a data template identifier linked with first data stream 105, then parsing engine 110 selects the data template 117 that is identified by the data template identifier at step 214. For example, parsing engine 110 may use the data template identifier to key into stored data template table 115 to select the appropriate data template 117. If there is no template identifier linked with data stream 105, then execution proceeds to decisional step 208. At step 208, parsing engine 110 determines if there is a data template 117 linked with data source 102a. For example, parsing engine 110 may select the appropriate data template 117 based upon the communications port in interface 108, an identifier of first data source 102a contained in the header in first data stream 105 or any other data suitable to determine data source 102a. If there is a data template 117 that is linked with first data source 102a, then execution proceeds to step 214, where parsing engine 110 selects data template 117 linked with first data source 102a.

If there is no data template 117 linked with first data source 102a, then parsing engine 110 attempts to locate one data template 117 from stored data template table 115 that is compatible with the received first data stream 105 in steps 210 through 212. It should be understood that while steps 210 and 212 illustrate parsing engine 110 sequentially processing stored data templates 117, these operations may occur in parallel. At step 210, parsing engine 110 selects a first data template 117 from stored data template table 115. Parsing engine 110 then determines if the selected data template 117 is compatible with the received first data stream 105 at step 212. If the first data template 117 is not compatible with the received data stream 105, then execution returns to step 210, where parsing engine 110 selects the next stored data template 117 from stored data template table 115. Once a compatible data template 117 is found, execution proceeds to step 214, where parsing engine 110 selects the compatible data template 117 for use in further processing.

Once parsing engine 110 has selected the appropriate data template 117, parsing engine 110 uses the selected data template 117 to extract data from first data stream 105 in steps 216 through 248. At step 216, parsing engine 110 selects a first data template region from data template 117. Parsing engine 110 then selects a first regular expression from the data template region at step 218. At step 220, data stream 105 is scanned for the selected first regular expression to locate the beginning of a similar data region. As described above, if parsing engine 110 is unable to locate the regular expression, then parsing engine 110 may scan data stream 105 for an alternate expression defined in data template 117. Parsing engine 110 then selects a second regular expression from the data template region at step 222. At step 224, parsing engine 110 scans data stream 105 for the selected second regular expression to locate the ending of the data region. It should be understood that for more efficient processing, it may attempt to locate the second regular expression in data stream 105 in the portions that follow the first regular expression. If the data region that is delimited by the first and second regular expressions is not located in data stream 105, then execution proceeds to step 246 where additional data template regions are processed. Otherwise, if the data region delimited by the first and second regular expressions is found, then execution proceeds to step 228. At step 228, parsing engine 110 selects the data region in data stream 105 that is delimited by the located first and second regular expressions.

Once the data region has been located in data stream 105, parsing engine 110 processes the located data region in steps 230 through 244. At step 230, parsing engine 110 selects a first sub-expression from the data template region. Parsing engine 110 then scans the data region from data stream 105 for a data element that matches the selected sub-expression at step 232. Again, if parsing engine 110 is unable to locate the regular expression, then parsing engine 110 may scan data stream 105 for an alternate expression defined in data template 117. Alternatively or in combination, parsing engine 110 may scan an alternate data region for the regular or alternate sub-expression. At decisional step 234, if the sub-expression (or its alternate) is not found in the data region, then execution proceeds to step 242. If the sub-expression is found in data stream 105, parsing engine 110 extracts the data element, or matching sub-expression, from data stream 105 at step 236. Parsing engine 110 then assigns the sub-expression identifier to the extracted data at step 238. At step 240, parsing engine 110 stores the extracted data in intermediate store 125 using the sub-expression identifier. In one embodiment, this may be a name-value pair. At decisional step 242, parsing engine 110 determines if there are more sub-expressions in the data template region. If there are more sub-expressions, then parsing engine 110 selects the next sub-expression from the data template region at step 244 and execution returns to step 232. If there are no more sub-expressions in the data template region, then execution proceeds to step 246. At decisional step 246, parsing engine 110 determines if there are more data regions in the selected data template 117. If there are no more data regions, then execution ends. Otherwise, parsing engine 110 selects the next data template region at step 248 and execution returns to step 218 for regular processing. This combination of operations will, in many circumstances, result in normalized data that is provided by a more efficient processing of data streams 105.

The preceding flowchart and accompanying description illustrates exemplary methods of operation for processing data streams with different formats for multiple data sources. However, these methods are merely illustrative and system 100 contemplates parsing engine 110 implementing any suitable techniques for processing data streams 105 using some or all of the disclosed method. Thus, any or all of these techniques may be used separately and/or together as appropriate to efficiently process data streams 105. Moreover, because the flowchart and description is only illustrative, system 100 contemplates parsing engine 110 using methods with additional steps, fewer steps, and/or, so long as the method remains appropriate.

Although the present invention has been described in detail, it should be understood that various changes, substitutions and alterations can be made hereto without departing from the sphere and scope of the invention as defined by the appended claims.

To aid the Patent Office, and any readers of any patent issued on this application in interpreting the claims appended hereto, applicants wish to note that they do not intend any of the appended claims to invoke ¶ 6 of 35 U.S.C. § 112 as it exists on the date of filing hereof unless the words "means for" or "step for" are explicitly used in the particular claim.

What is claimed is:

1. A method for processing data streams from multiple data sources, the method comprising:
    using at least one or more processors, receiving a data stream from a data source;
    using at least one or more processors, dynamically selecting a data template, the data template comprising at least one data template region;
    using at least one or more processors, selecting a data region of the data stream based on one of the data template regions;
    using at least one or more processors, mapping at least a portion of the data region to an intermediate data store based on the data template region;

using at least one or more processors, extracting the mapped portion of the data region; and using at least one or more processors, storing the extracted portion in the intermediate data store.

2. The method of claim 1 further comprising:

using at least one or more processors, converting the extracted portion of the data region to an intermediate format; and wherein storing the extracted portion in the intermediate data store comprises storing the converted extracted portion in the intermediate data store.

3. The method of claim 1, wherein dynamically selecting a data template comprises dynamically selecting the data template based on the data source.

4. The method of claim 1 further comprising:

using at least one or more processors, receiving the data template from the data source; and wherein dynamically selecting a data template comprises selecting the received data template.

5. The method of claim 1, wherein the data stream comprises a first data stream, the data source comprises a first data source, and the data template comprises a first data template, the method further comprising:

using at least one or more processors, receiving a second data stream from a second data source, wherein the second data source differs from the first data source;

using at least one or more processors, dynamically selecting a second data template;

using at least one or more processors, selecting a data region of the second data stream based on one of the second data template regions;

using at least one or more processors, mapping at least a portion of the data region of the second data stream to the intermediate data store based on the second data template region;

using at least one or more processors, extracting the mapped portion of the data region of the second data stream; and using at least one or more processors, storing the extracted portion of the second data stream in the intermediate data store.

6. The method of claim 1, wherein the data region comprises a first data region and the data template region comprises a first data template region, the method further comprising:

using at least one or more processors, determining an end of the first data region based on the first data template region;

using at least one or more processors, selecting a second data region of the data stream based on a second data template region;

using at least one or more processors, mapping at least a portion of the second data region to the intermediate data store based on the data template region;

using at least one or more processors, extracting the mapped portion of the second data region; and using at least one or more processors, storing the second extracted portion of the data stream in the intermediate data store.

7. The method of claim 1, wherein selecting a data region of the data stream based on one of the data template regions comprises:

selecting a regular expression from one of the data template regions;

scanning the data stream for the regular expression;

selecting a second regular expression from the data template region;

scanning the data stream for the second regular expression; and selecting data in the data stream delimited by the first and second regular expressions.

8. The method of claim 1, wherein mapping at least a portion of the data region to an intermediate data store comprises:

selecting at least one sub-expression from the data template region, each sub-expression having a unique identifier; and scanning the data region of the data stream for each sub-expression.

9. The method of claim 8, wherein the data region comprises a first data region and, in response to not locating one sub-expression in the data region of the data stream, the method further comprising:

using at least one or more processors, selecting an alternate data region of the data stream based on the data template;

using at least one or more processors, scanning the alternate data region of the data stream for the sub-expression;

using at least one or more processors, mapping at least a portion of the alternate data region of the data stream to the intermediate data store based on the data template region; and using at least one or more processors, extracting the mapped portion of the alternate data region of the data stream.

10. The method of claim 8, wherein in response to not locating one sub-expression in the data region of the data stream, the method further comprising:

using at least one or more processors, selecting an alternate expression from the data template region, the alternate sub-expression having a unique identifier; and using at least one or more processors, scanning the data region of the data stream for the alternate expression.

11. The method of claim 8, wherein extracting the mapped portion of the data region comprises creating a datum in response to locating data in the data region that matches one sub-expression, the datum comprising the respective identifier of the sub-expression and the located data.

12. The method of claim 1 further comprising:

using at least one or more processors, scanning the received data stream for a template identifier; and wherein dynamically selecting a data template comprises selecting the data template based on the template identifier.

13. The method of claim 1, wherein dynamically selecting a data template comprises:

selecting a first data template; and in response to the first data template being incompatible with the received data stream, selecting a second data template.

14. Software for processing data from multiple data sources, the software encoded in one or more computer-readable media and, when executed by one or more processors, operable to:

receive a data stream from a data source;

dynamically select a data template, the data template comprising at least one data template region;

select a data region of the data stream based on one of the data template regions;

map at least a portion of the data region to an intermediate data store based on the data template region;

extract the mapped portion of the data region; and store the extracted portion in the intermediate data store.

15. The software of claim 14 further operable to:
convert the extracted portion of the data region to an intermediate format; and
wherein the software operable to store the extracted portion in the intermediate data store comprises the software operable to store the converted extracted portion in the intermediate data store.

16. The software of claim 14, wherein the software operable to dynamically select a data template comprises the software operable to dynamically select the data template based on the data source.

17. The software of claim 14 further operable to:
receive the data template from the data source; and
wherein the software operable to dynamically select a data template comprises the software operable to select the received data template.

18. The software of claim 14, wherein the data stream comprises a first data stream, the data source comprises a first data source, and the data template comprises a first data template, the software further operable to:
receive a second data stream from a second data source, wherein the second data source differs from the first data source;
dynamically select a second data template;
select a data region of the second data stream based on one of the second data template regions;
map at least a portion of the data region of the second data stream to the intermediate data store based on the second data template region;
extract the mapped portion of the data region of the second data stream; and
store the extracted portion of the second data stream in the intermediate data store.

19. The software of claim 14, wherein the data region comprises a first data region and the software further operable to:
determine an end of the first data region based on the data template region;
select a second data region of the data stream based on a second data template region;
map at least a portion of the second data region to the intermediate data store based on the data template region;
extract the mapped portion of the second data region; and
store the second extracted portion of the data stream in the intermediate data store.

20. The software of claim 14, wherein the software operable to select a data region of the data stream based on one of the data template regions comprises the software operable to:
select a regular expression from one of the data template regions;
scan the data stream for the regular expression;
select a second regular expression from the data template region;
scan the data stream for the second regular expression; and
select data in the data stream delimited by the first and second regular expressions.

21. The software of claim 14, wherein the software operable to map at least a portion of the data region to an intermediate data store comprises the software operable to:
select at least one sub-expression from the data template region, each sub-expression having a unique identifier; and
scan the data region of the data stream for each sub-expression.

22. The software of claim 21, wherein, in response to the software not locating one sub-expression in the data region of the data stream; the software further operable to:
select an alternate sub-expression from the data template region, the alternate sub-expression having a unique identifier; and
scan the data region of the data stream for the alternate sub-expression.

23. The software of claim 21, wherein the data region comprises a first data region and, in response to the software not locating one sub-expression in the data region of the data stream, the software further operable to:
select an alternate data region of the data stream based on the data template;
scan the alternate data region of the data stream for the sub-expression;
map at least a portion of the alternate data region of the data stream to the intermediate data store based on the data template region; and
extract the mapped portion of the alternate data region of the data stream.

24. The software of claim 21, wherein the software operable to extract the mapped portion of the data region comprises the software operable to create a datum in response to locating data in the data region that matches one sub-expression, the datum comprising the respective identifier of the sub-expression and the located data.

25. The software of claim 14 further operable to:
scan the received data stream for a template identifier; and
wherein the software operable to dynamically select a data template comprises the software operable to select the data template based on the template identifier.

26. The software of claim 14, wherein the software operable to dynamically select a data template comprises the software operable to:
select a first data template; and
in response to the first data template being incompatible with the received data stream, select a second data template.

* * * * *